United States Patent [19]

Tsai

[11] Patent Number: 5,861,622
[45] Date of Patent: Jan. 19, 1999

[54] HANDY SCANNER HAVING SCANNING PATH STRAIGHTNESS-MAINTAINING MECHANISM

[75] Inventor: Jenn-Tsair Tsai, Tao-Yung, Taiwan

[73] Assignee: Mustek Systems Inc., Taiwan

[21] Appl. No.: 790,850

[22] Filed: Feb. 3, 1997

[51] Int. Cl.$^6$ ............................... H01J 3/14; G06K 9/22
[52] U.S. Cl. ...................... 250/234; 250/239; 358/473; 358/497
[58] Field of Search ................................ 250/234, 235, 250/236, 239; 358/473, 494, 497; 235/472, 470, 462, 454

[56] References Cited

U.S. PATENT DOCUMENTS

| 5,182,450 | 1/1993 | Pan | 250/234 |
| 5,412,205 | 5/1995 | McVicar et al. | 250/234 |

*Primary Examiner*—Edward P. Westin
*Assistant Examiner*—John R. Lee
*Attorney, Agent, or Firm*—Rabin & Champagne, P.C.

[57] ABSTRACT

A handy scanner for scanning an image by user hand-held operation along the surface of a sheet of document is disclosed. The scanner includes an illumination light source for illuminating the image for scanning, an image pick-up mechanism receiving the light reflected from the image illuminated to be scanned, and converting the received light into an image electrical signal, a moving mechanism used for conducting movement of the scanner over the surface of the image, a position detector coupled to the moving mechanism for detecting the position of the apparatus over the image surface, an electronic circuitry coupled to the image pick-up mechanism and the position detector used for receiving the image electrical signal and the position electrical signal respectively and processing them, and a scanning path straightness-maintaining mechanism used for assisting to constrain scanning movement of the scanner in an intended straight line for achieving optimized scanning effect. User fatigue can therefore be reduced due to simplified effort for maintaining straight line scanning under the assistance of the straightness mechanism.

9 Claims, 3 Drawing Sheets 4,861,622

HANDY SCANNER HAVING SCANNING PATH STRAIGHTNESS-MAINTAINING MECHANISM

BACKGROUND OF THE INVENTION

Field of the Invention

This invention relates to image scanners, and in particular, to handy scanners having a mechanism assisting to maintain the straightness of the hand-controlled scanning path. More particularly, this invention relates to handy scanners having a scanning straightness-maintaining mechanism for reducing user fatigue.

Technical Background

Handy scanners are small, convenient and low-cost image scanning devices that can be easily linked with a personal computer system as an image input device. As microprocessors becomes ever powerful, image processing has become a widely popular task performed by personal computers found in the general offices and homes.

FIGS. 4 and 5 of the accompanying drawings of the invention schematically show the constituent components typically making up a conventional handy scanning device as well as the inter-relationship of these components to each other. FIG. 4 depicts the device as viewed from the top with the cover removed, while FIG. 5 is another view from the side. A typical handy scanner essentially comprises an illumination light source, an image pick-up mechanism, a moving mechanism, a position detector, and an electronic circuitry, all enclosed inside a protective and supporting casing.

As is shown in the drawings, the illumination light source, such as the elongated rod-shaped light source 0 shown in both FIGS. 4 and 5, is responsible for generating the light used to illuminate the image to be scanned. As the handy scanner is moved on the document, the currently scanned scope 1 requires sufficient and even illumination, so as to achieve optimized image scanning effect.

The image pick-up mechanism is composed of a photo-sensing element such as a charge-coupled device (CCD) 23 and an optical system including a reflective mirror 21 and a focusing lens 22, wherein the CCD 23 receives its photo signals via the optical system. As can be seen from FIG. 5, light emanated from the illumination light source 0 is reflected by the surface of the scanned document 9 and directed toward the reflective mirror 21. The light conveying the image information is reflected by the mirror 21 and directed toward the focusing lens 22, which then makes the reflected light be focused at the CCD 23. As persons skilled in the art are aware, the CCD 23 then converts its received light signal into electrical signals for subsequent processing for the purpose of image scanning.

The moving mechanism for the handy scanner includes a cylindrical roller wheel 31 and a pair of sliding pads 32. This moving mechanism is responsible for smooth and evenly-controlled movement of the image scanner over the surface of the scanned document. As is shown in FIG. 4, the two sliding pads 32 are each assigned to one corner of the scanning device at one end, while the cylindrical roller wheel 31 is arranged at the opposite end. As the image scanner is dragged along the surface of the scanned document, the cylindrical roller wheel 31 is allowed to roll over the document surface, while the two sliding pads 32 simply slide.

Position detector of the image scanner includes a gear set 41 of two gears, an encoding disk 42 and a photo sensor 43. The position detector is directly coupled to the movement mechanism of the image scanner. The position detector is used to detect the position where the handy scanner is located in a top-down direction over the surface of the scanned document. As can be seen in the drawings, the gear set 41 is coupled to the roller wheel 31 which allows the rotation of the roller wheel 31 to be transmitted to the encoding disk 42, as the latter is also directly coupled to the gear set 41. Rotation of the cylindrical roller wheel 31 incurred by the dragged movement by the user of the scanner thus can be translated into position coding in the position detector. As the position encoding disk 42, which has tiny and regularly-spaced slots distributed in a circumferential direction, is driven to rotate, a light signal emitted in one part of the photo sensor 43 is intermittently received at the opposite part of the sensor 43. The number of light signals detected can be translated into the travelling distance of the scanning device, so that position information thereof thus can be derived. This position information is used to control the image composition as it is picked up in the scanning process.

The electronic circuitry, which is not shown in the drawing, can be coupled to receive the scanned image information signal as sent over by the CCD 23 of the image pick-up mechanism. The circuitry also receives position information obtained and relayed by the photo sensor 43 of the scanner position detector. The received signals are pre-processed in the electronic circuitry and can then be transmitted to the host personal computer system for composition of the scanned image.

Although the conventional handy scanners as described above are convenient and cheap, straightness of scanning path is a requirement to ensure proper function of the handy scanners. Specifically, the handy scanner must be dragged over the image surface in a straight line along the scanning path, otherwise some distortions would be introduced in the scanned image. Precise control of these handy scanners when in use might cause fatigue of the muscles of the user.

SUMMARY OF THE INVENTION

It is therefore an object of the present invention to provide a handy scanner having a scanning path straightness-maintaining mechanism for assisting to maintain sufficiently precise straight line scanning.

It is another object of the present invention to provide a handy scanner having a scanning path straightness-maintaining mechanism for reducing user fatigue when maintaining sufficiently precise straight line scanning.

The present invention achieves the above-identified objects by providing a handy scanner for scanning an image by user hand-held operation along the surface of a sheet of document. The scanner includes: an illumination light source for illuminating the image for scanning, an image pick-up mechanism which receives light reflected from the image illuminated to be scanned, and converts the received light into image electrical signal, a moving mechanism for conducting movement of the scanner over the surface of the image, a position detector coupled to the moving mechanism for detecting the position of the apparatus over the image surface, and the detected position is converted into position electrical signal, electronic circuitry, coupled to the image pick-up mechanism and the position detector, which is used for receiving the image electrical signal and the position electrical signal respectively, a scanning path straightness-maintaining mechanism used for assisting to constrain scanning movement of the scanner in an intended straight line such that optimized scanning effect can be derived. User fatigue can therefore be reduced due to simplified effort for maintaining straight line scanning under the assistance of the straightness mechanism.

BRIEF DESCRIPTION OF THE DRAWING

Other objects, features, and advantages of the present invention will become apparent by way of the following detailed description of the preferred but non-limiting embodiments. The description is made with reference to the accompanied drawings in which.

DETAILED DESCRIPTION OF THE PREFERRED EMBODIMENT

Figure 1:
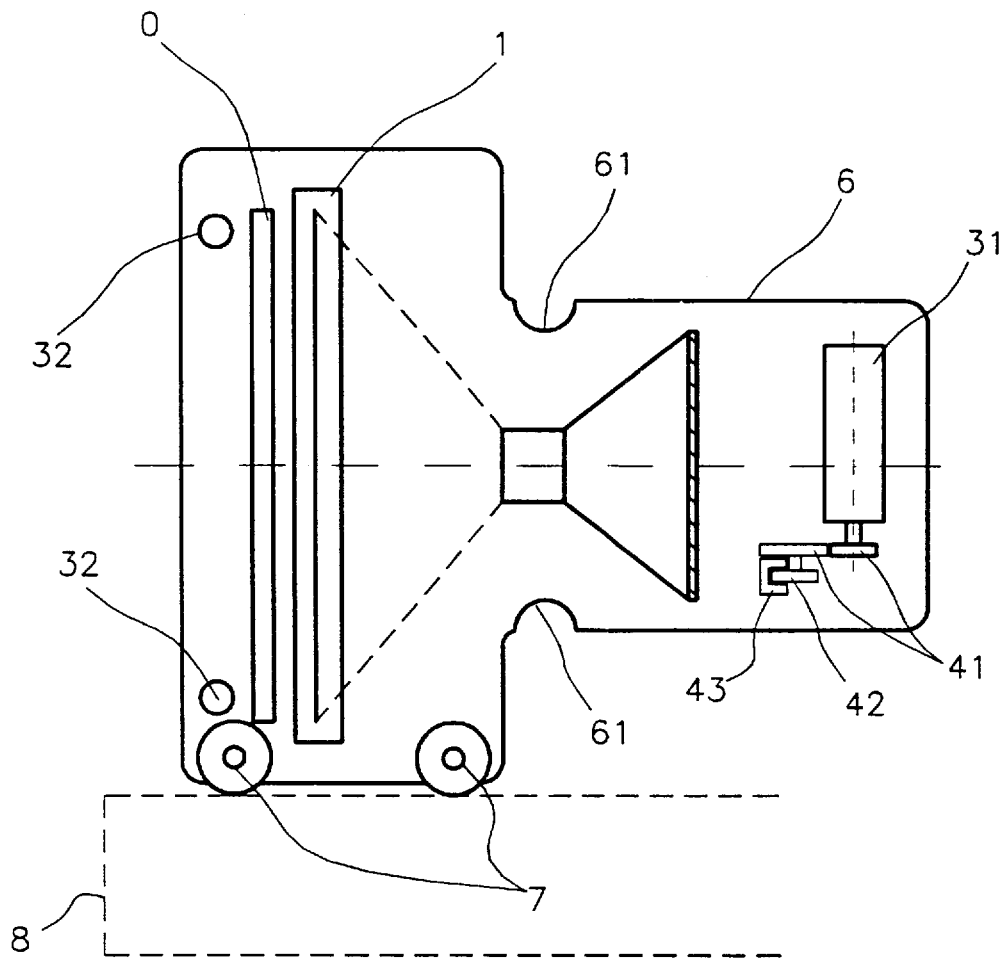
FIG. 1 schematically illustrates a handy scanner in accordance with a preferred embodiment of the invention depicting the constituent components thereof as viewed from the top.
Figure 2:
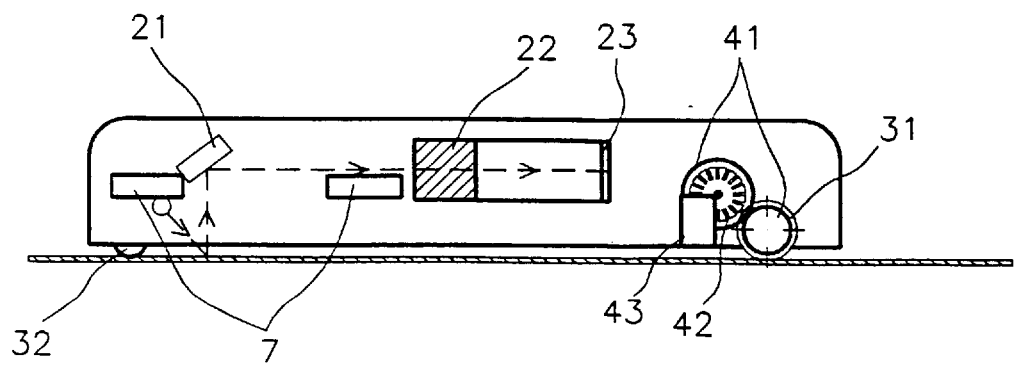
FIG. 2 schematically illustrates the handy scanner of FIG. 1 depicting the constituent components thereof as viewed from the side.

FIGS. 1 and 2 of the invention schematically show the constituent components comprising a handy scanner in accordance with a preferred embodiment of the invention. Inter-relationship of these components to each other can be observed in the drawing. FIG. 1 depicts the device as viewed from the top, with the top cover removed, while FIG. 2 is another view from the side. This exemplified handy scanner essentially comprises an illumination light source, an image pick-up mechanism, a moving mechanism, a position detector, a electronic circuitry, and a scanning path straightness-maintaining mechanism, all enclosed inside a protective and supporting casing.

As is shown in FIGS. 1 and 2, the illumination light source, such as light source 0, is an elongated rod-shaped light source that is responsible for generating the light used to illuminate the image to be scanned. The image, which can be that appearing on the surface of a sheet of paper or document, can be evenly illuminated by the light source 0 so that properly bright and clear image can be picked up by the sensor subsystem of the device to be described later. As the image scanner travels along its scanning path, the proximity 1 currently being scanned requires sufficient and even illumination, so as to achieve optimized image scanning effect.

The image pick-up mechanism is constructed based on a photo-sensing element such as a CCD 23 that receives its photo signals via an optical system. The optical system includes a reflective mirror 21 and a focusing lens 22, and is used to collect the image light at the sensor plane of the CCD 23. As shown in FIG. 2, light emanating from the illumination light source 0 is reflected by the surface of the scanned document 9. The light reflected from the image is then directed toward the reflective mirror 21. The mirror 21 then relays the light conveying the image information to the CCD 23 via focusing by the focusing lens 22. The CCD 23 converts its received light signal into an electrical signal and transmits the electrical signal to the electronic circuitry. The focusing lens 22 also provides the function of reducing the image size at the sensor region of the CCD 23.

The moving mechanism for the handy scanner embodiment includes a cylindrical roller wheel 31 and a pair of sliding pads 32. This moving mechanism is used to maintain smooth and evenly-controlled movement of the image scanner over the surface of the scanned document. As shown in FIG. 1, the two sliding pads 32 are each assigned to one comer of the scanning device at one end, while the cylindrical roller wheel 31 is arranged at the opposite end. As the image scanner is dragged along the surface of the scanned document, the cylindrical roller wheel 31 is allowed to roll over the document surface, while each of the two sliding pads 32 simply slides.

The position detector of the image scanner includes a gear set 41 of two gears, an encoding disk 42 and a photo sensor 43. As in the case of the conventional image scanner, the position detector is a system directly coupled to the movement mechanism of the image scanner. The position detector is used to reflect the position of the scanning device along the scanning path over the surface of the scanned document. As can be seen from the drawings, the gear set 41 is coupled to the roller wheel 31 which allows the rotation of the roller wheel 31 to be transmitted to the encoding disk 42. The encoding disk 42 is also directly coupled to the gear set 41, and thus rotation of the cylindrical roller wheel 31 incurred by the dragged movement by the user of the scanner can be translated into position coding in the position detector. The gear ratio of the gear set 41 can be selected to be suitable for the designed resolution of the scanning device. Factors affecting the gear ratio and the size of gears of the set 41 further include the size of the encoding disk 42 as well as the total number of slots drilled thereon.

As the position encoding disk 42 having tiny and regularly-spaced slots in circumferential direction of the disk is driven to rotate, a light signal emitted in one part of the photo sensor 43 is intermittently received at the opposite part of the sensor 43. The number of light signals detected can be translated into position, or distance of travel, of the scanning device. This position, or distance, information is used to control the image composition as it is picked up in the scanning process.

The electronic circuitry, which is not shown in the drawing, can be coupled to receive the scanned image information signal as sent over by the CCD 23 of the image pick-up mechanism. The circuitry also receives position information obtained and relayed by the photo sensor 43 of the scanner position detector. The received signals are pre-processed in the electronic circuitry and can then be transferred to the host system for composition of the scanned image.

The scanning path straightness-maintaining mechanism comprises a pair of rollers, or wheels, 7 installed partially internal to the casing 6 of the scanning device, and a straightness guide 8 that may be physically separated from the body of the scanner. Rollers 7 have the central axes of rotation thereof arranged substantially vertical to the plane of the scanned document. As shown in the top view of FIG. 1, the major portion of the circular body of each of the two rollers 7 is hidden inside the casing 6 of the scanning device. Only a portion of the roller 7 sufficient for contact with the corresponding guide surface of the straightness guide 8 is protruded out of the surface of the casing 6.

The guide surface of the straightness guide 8 that provides for the guiding rotational contact with the rollers 7 is a straight and flat surface. When a user operates the scanning device of the invention, the scanner can be firmly grabbed by the user with the two rollers 7 abutting against the guide surface of the straightness guide 8 as it is dragged along the scanning path for effecting an image scan. Before the scanning can be effected, however, the straightness guide 8 has to be placed at the proper location over the surface of the scanned document.

Over the external surface of the casing 6 of the scanning device, recessions 61 having suitable sizes and curvatures can be formed at the proper locations that assist in the accommodation of user fingers when the device is operated. Shapes and dimensions of these two finger grab recessions 61 can be the same or not the same. Presence of these finger grab recessions 61 can be helpful in assisting fatigue-free handling of the scanning device as it is operated.

Figure 3:
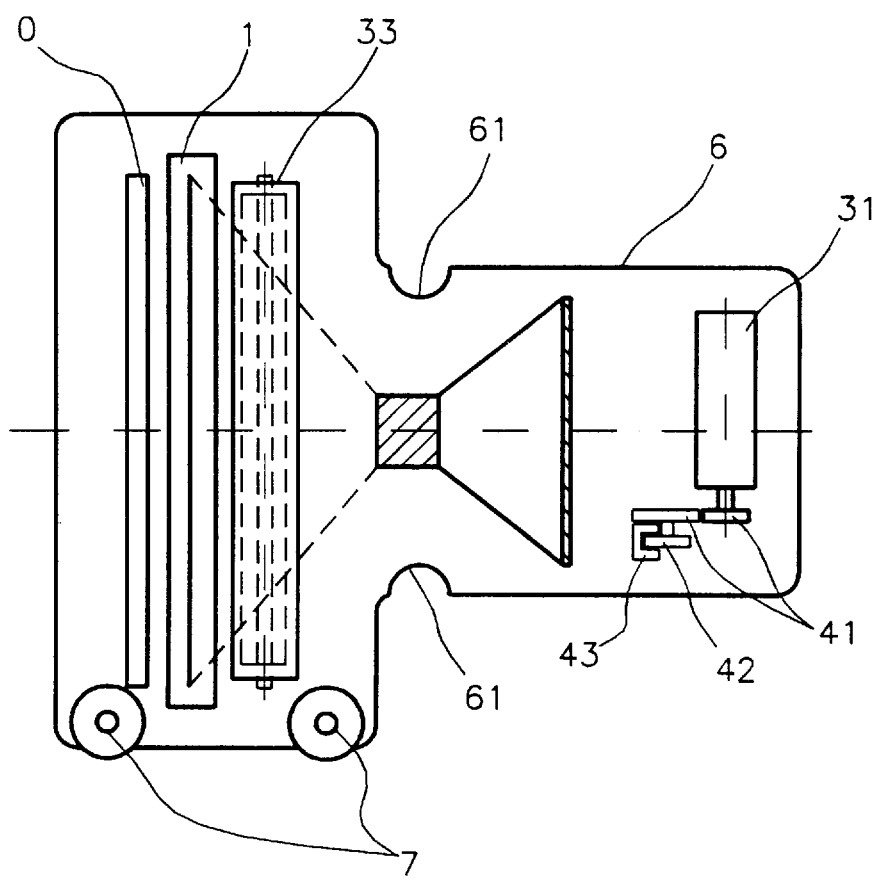
FIG. 3 schematically illustrates a handy scanner in accordance with another preferred embodiment of the invention depicting the constituent components thereof as viewed from the top.
Figure 4:
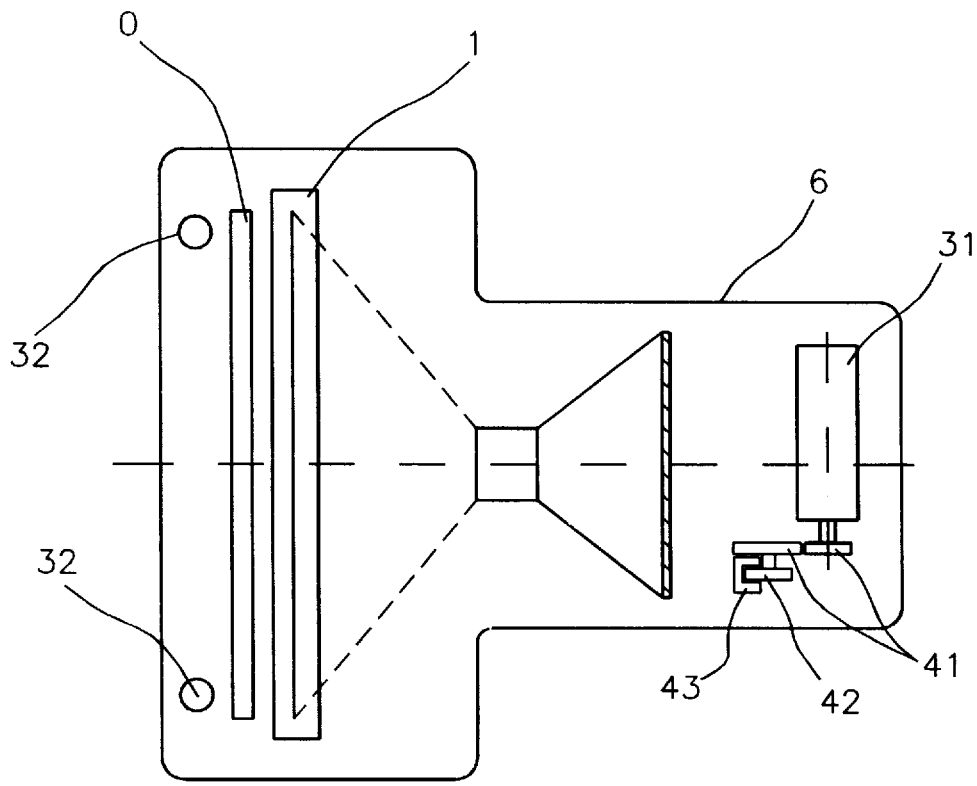
FIG. 4 schematically illustrates a conventional handy scanner depicting the constituent components thereof as viewed from the top.
Figure 5:
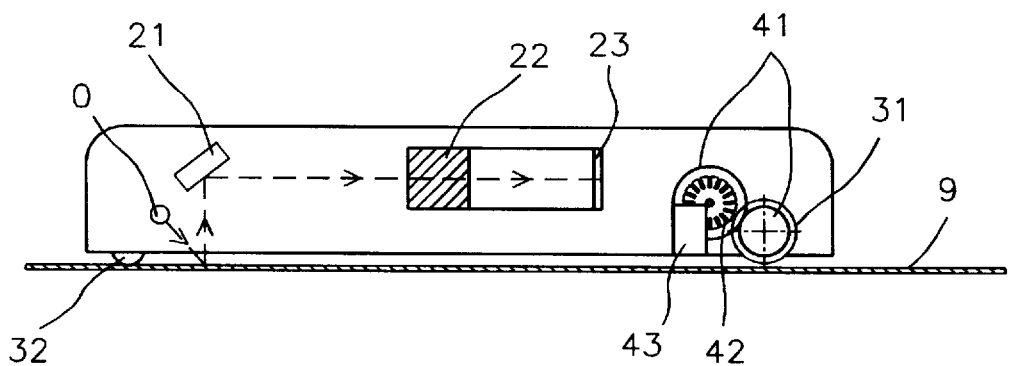
FIG. 5 schematically illustrates the conventional handy scanner of FIG. 4 depicting the constituent components thereof as viewed from the side.

FIG. 3 schematically illustrates a handy scanner in accordance with another preferred embodiment of the invention depicting the constituent components thereof as viewed from the top. In this further embodiment, the pair of sliding pads 32 are replaced by an auxiliary cylindrical roller wheel 33. With the use of two roller wheels 31 and 33, further with the assistance of the scanning path straightness-maintaining mechanism, the image scanning results can be optimized to the best quality possible.

Thus, as persons skilled in the art may well appreciate, the above description of the preferred embodiment of the invention is intended only for the purpose of the description, not for the limitation, of the scope of the invention. Modifications to the outlined embodiments of the invention may be apparent and should be considered to be within the scope of the invention as recited in the claims which follow.

What is claimed is:

1. A hand-held image scanning apparatus, comprising:

a casing; and a pair of guide rollers attached to said casing, each having an axis of rotation that is perpendicular to a surface to be scanned.

2. An image scanning apparatus for scanning an image by user hand-held operation along a surface of an the image to be scanned, said apparatus comprising:

an illumination light source for illuminating the image;

an image pick-up mechanism receiving light reflected from the illuminated image, said image pick-up mechanism converting the received light into an image electrical signal;

a scanning movement means for conducting movement of said scanning apparatus over the surface of the image;

a position detector coupled to said scanning movement means for detecting a position of said apparatus over the surface of the image, the detected position being converted into a position electrical signal;

electronic circuitry coupled to said image pick-up mechanism and said position detector for receiving, the image electrical signal and the position electrical signal, respectively, for processing; and a scanning path straightness-maintaining means for assisting to constrain movement of said scanning apparatus in an intended straight line for achieving optimized scanning effect, and comprising a pair of guide rollers, each of said guide rollers having a central axis of rotation thereof arranged perpendicular to the surface of the scanned image.

3. The image scanning apparatus of claim 2, wherein said scanning path straightness-maintaining means further comprises a straightness guide means, said guide means having an elongated flat surface perpendicular to the surface of said scanned image for engagement with said pair of guide rollers.

4. The image scanning apparatus of claim 3, wherein said illumination light source is a rod-shaped elongated light source.

5. The image scanning apparatus of claim 4, wherein said illumination light source has adjustment means for adjusting the intensity of illumination against the scanned image.

6. The image scanning apparatus of claim 3, wherein said image pick-up mechanism comprises a charge-coupled device image sensor and an optical system comprising a reflective mirror and a focusing lens, the light reflected from the illuminated image being reflected by said mirror and focussed onto said charge-coupled device image sensor by said focusing lens.

7. The image scanning apparatus of claim 3, wherein said scanning movement means comprises a cylindrical roller wheel and a pair of sliding pads, said cylindrical roller wheel rolling over the surface of the scanned image, and each of said pair of sliding pads sliding over the surface of the scanned image when said apparatus is operated.

8. The image scanning apparatus of claim 6, wherein said scanning movement means further comprises an auxiliary cylindrical roller wheel.

9. The image scanning apparatus of claim 3, wherein said position detector comprises a gear set, an encoding disk and a photo sensor, said gear set being coupled directly to said scanning movement means and to said encoding disk, said encoding disk having a plurality of slots drilled along a periphery thereof, and said photo sensor having a light emitting means and a light receiving means arranged opposite to each other with respect to said encoding disk, whereby movement of said apparatus drives said gear set, and said gear set drives said encoding disk for intermittently sending light signals from said light emitting means into said light receiving means.

* * * * *